(12) United States Patent
Fink

(10) Patent No.: US 6,288,567 B1
(45) Date of Patent: Sep. 11, 2001

(54) DEVICE FOR SETTING OPERATING PARAMETERS IN A PLURALITY OF PROGRAMMABLE INTEGRATED CIRCUITS

(75) Inventor: Hans-Joerg Fink, Freiburg (DE)

(73) Assignee: Micronas GmbH (DE)

( * ) Notice: Subject to any disclaimer, the term of this patent is extended or adjusted under 35 U.S.C. 154(b) by 0 days.

(21) Appl. No.: 09/528,764

(22) Filed: Mar. 17, 2000

(30) Foreign Application Priority Data

Mar. 19, 1999 (DE) .............................................. 199 12 446

(51) Int. Cl.[7] .................................................. H03K 19/173
(52) U.S. Cl. .................................................. 326/38; 326/37
(58) Field of Search ................... 326/37–41, 46, 326/47

(56) References Cited

U.S. PATENT DOCUMENTS

| | | | |
|---|---|---|---|
| 5,336,950 | * | 8/1994 | Popli et al. .............................. 326/39 |
| 6,100,715 | * | 8/2000 | Agrawal et al. ......................... 326/39 |
| 6,114,873 | * | 9/2000 | Sahraoui et al. ........................ 326/39 |

* cited by examiner

Primary Examiner—Michael Tokar
Assistant Examiner—Don Phu Le
(74) Attorney, Agent, or Firm—Harness, Dickey & Pierce, P.L.C.

(57) ABSTRACT

A device for setting operating parameters in a plurality of programmable integrated circuits in which each integrated circuit has a ground terminal, at which ground potential is present, an input, via which digital control commands are fed, and an output, via which control information items concerning the state of the integrated circuit are output.

11 Claims, 2 Drawing Sheets

DEVICE FOR SETTING OPERATING PARAMETERS IN A PLURALITY OF PROGRAMMABLE INTEGRATED CIRCUITS

The invention relates to a device for setting operating parameters in a plurality of programmable integrated circuits. Furthermore, the invention relates to a method for setting such operating parameters. Moreover, the invention relates to a programmable integrated circuit which allows such setting of operating parameters.

The product brochure "HAL800 Programmable Linear Hall Effect Sensor" Micronas Intermetall, Edition Aug. 24, 1998, describes a programmable integrated circuit in which operating parameters, for example the sensitivity, the filter response, the clamping voltage, the temperature characteristic and further parameters, can be set with the aid of an external controller. The magnetic field parameter detected by a Hall effect sensor is converted into an electrical voltage and output at the analog output. With the aid of the setting of the operating parameters, the integrated circuit with the Hall generator can be adapted intelligently to different ambient conditions. The setting of operating parameters is also referred to as a parameterization process.

It is conventional for an external calibration controller to be used for setting operating parameters in the integrated circuit, said controller being controlled by a microprocessor. This calibration controller transmits a digital data stream to the integrated circuit, said data stream being evaluated by the internal controller in the integrated circuit. In numerous applications, for example in the automobile industry, a plurality of programmable integrated circuits of the same type have to be provided on a single application object, for example on an engine of a motor vehicle. In a different application, for example in the test department, a multiplicity of identical programmable integrated circuits have to be tested simultaneously. In these cases, with the prior art, each programmable integrated circuit has to be individually connected to the calibration controller, and the digital data stream has to be transmitted individually to each integrated circuit. This procedure is laborious and confused, since a multiplicity of line paths have to be connected. In addition, the technical complexity is increased.

The object of the invention is to specify a device which enables the setting of operating parameters in a plurality of integrated circuits in a simple manner. Furthermore, the intention is to specify a method for simply setting operating parameters in a plurality of integrated circuits. Moreover, the intention is to specify a programmable integrated circuit with which the abovementioned device can be operated and the method can be carried out.

This object is achieved for a device by means of the features of claim 1. Advantageous developments are specified in the dependent claims.

According to the invention, the inputs of a plurality of integrated circuits are connected to one another. Each output is passed separately to the external control unit. As a result of an inhibit control command being output, all the integrated circuits are put into a state in which they ignore the control commands arriving via the inputs. At the same time, all the outputs of the integrated circuits are inactivated, that is to say these outputs output no analog and digital signals which describe the state of the integrated circuit. Rather, control signals present at each output can now be received and evaluated by the respective internal controller. The external control unit selects one of the integrated circuits and feeds an enable control signal via the output of said integrated circuit. The internal controller identifies this enable control signal and cancels the latching. The digital data stream which is then sent to all the integrated circuits and serves for setting the operating parameters is now evaluated only by the selected and activated integrated circuit, that is to say the operating parameters thereof are set. All of the other integrated circuits remain in the latched state, that is to say they cannot evaluate the digital data stream. In this way, every integrated circuit can gradually be selected by the external controller and the operating parameters of the respective integrated circuit can be set. The invention makes it possible, in a clear arrangement, to perform the setting of operating parameters for a multiplicity of integrated circuits in a simple and clear fashion, the outlay on lines or electrical connections being low.

In a preferred exemplary embodiment, each integrated circuit has only a ground terminal, an input terminal and an output terminal, the supply voltage being fed via the input terminal. Each programmable integrated circuit thus has only three terminals, as a result of which the outlay on lines is reduced further. Since the output terminal has a dual function, namely firstly the outputting of analog and digital signals which describe the working state of the integrated circuit, and secondly the function of an input via which the enable control signal is fed, the total number of terminals does not have to be increased, but a demultiplexer function is nevertheless fulfilled.

According to a further aspect of the invention, a method for setting operating parameters in a plurality of programmable integrated circuits is specified in accordance with claim 10. This method operates reliably, is clear and can be carried out in a simple manner.

An additional aspect of the invention relates to the structure of a programmable integrated circuit in accordance with claim 11. This integrated circuit is suitable for the device and for carrying out the abovementioned method. On account of the abovementioned dual function of the output, the number of terminals required is small even though a demultiplexer function can be realized.

An exemplary embodiment or the invention is explained below with reference to the drawing, in which.

Figure 1:
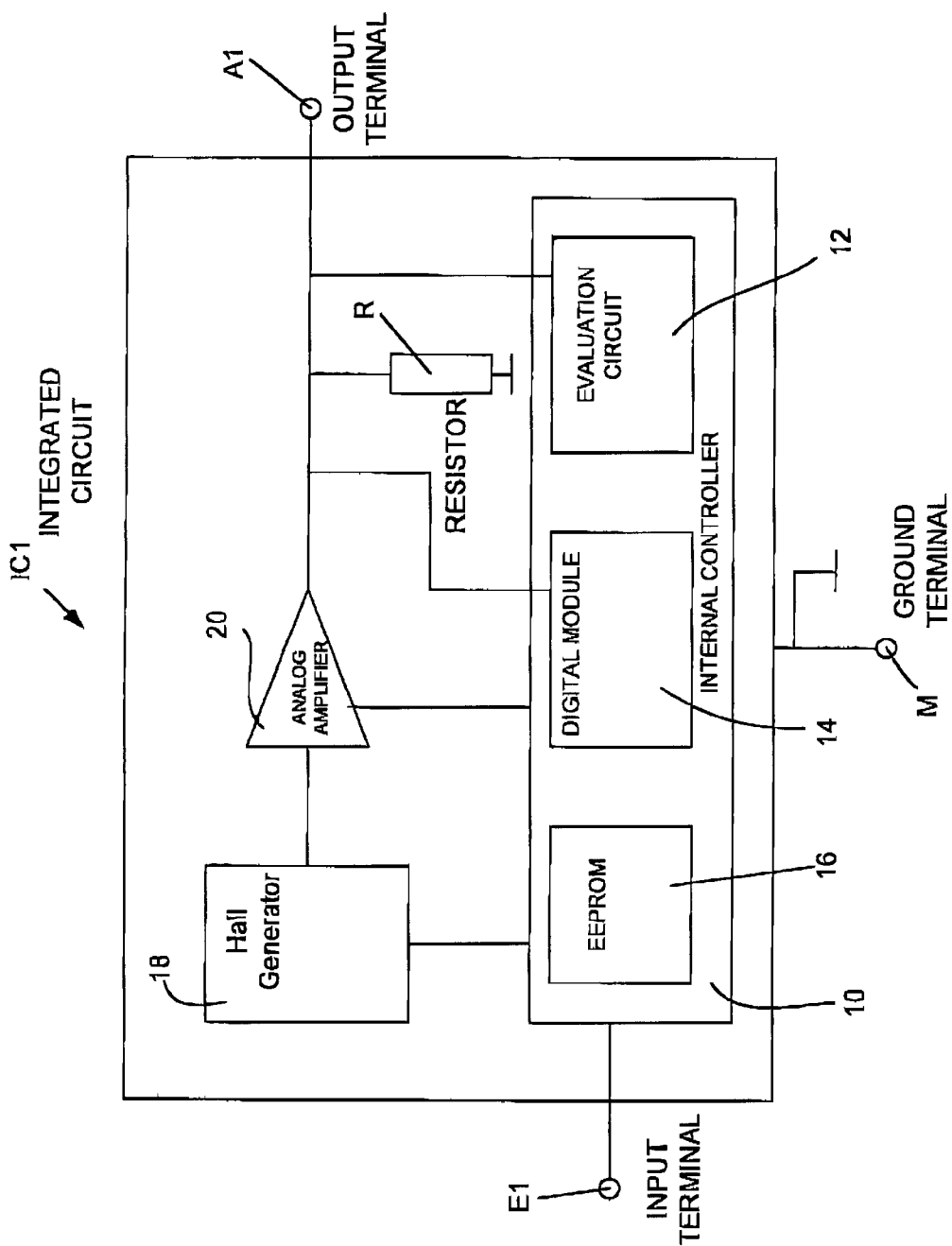
FIG. 1 shows the structure of a programmable integrated circuit.

FIG. 1 shows the structure of an integrated circuit IC1, which operates as a programmable linear Hall effect sensor. The integrated circuit IC1 has a ground terminal M connected to the metallic housing, an input terminal E1 and an output terminal A1. The integrated circuit IC1 contains an internal controller 10 which, in addition to further control sections relating e.g. to the digital process signal processing, has an evaluation circuit 12 and a digital module 14. Furthermore, the controller 10 includes an EEPROM module 16, in which digital data are stored.

As sensor, the integrated circuit IC1 contains a Hall generator 18, whose output signal is amplified by a programmable analog amplifier 20. The output of the amplifier 20 is passed to the output A1 and, via a resistor R, to ground. The integrated circuit IC1 can be used for example for angle or displacement measurement if it is used in combination with a rotating or linearly moving magnet.

The technical properties of the integrated circuit IC1 can be set individually by the customer. By way of example, it is possible to set the temperature characteristic, the output voltage range, the sensitivity when used in a specific operating environment, etc. To that end, digital control commands are fed via the input E1, via which the normal operating voltage is also fed. These digital control commands are present in the form of operating voltage modulation, the voltage values for defining the binary states being larger than the supply voltage. The digital commands are evaluated by the internal controller 10, data being written to the EEPROM module 16. With the aid of these data in the EEPROM module 16, the technical features of the integrated circuit IC1 are defined in the working mode thereof. During the programming of the integrated circuit IC1, the digital module 14 outputs protocol signals at the output A1, an external controller evaluating said protocol signals and, at the same time, checking the functionality of the integrated circuit IC1. The programming of the integrated circuit IC1 is concluded by the outputting of an END command. After the reception of this END command, the internal controller 10 initiates the nonvolatile storage of the data in the EEPROM module 16 and activates the output of the amplifier 20, with the result that an analog voltage corresponding to the magnetic field parameter detected by the Hall generator 18 is present at the output A1.

The internal controller 10 is constructed in such a way that when an inhibit control command is received at the input E1, said internal controller inactivates both the amplifier 20 and the digital module 14. Furthermore, the control commands arriving at the input E1 are no longer evaluated by the internal controller, that is to say programming of the integrated circuit IC1 is no longer possible. The evaluation circuit 12 remains active, however, and detects voltage states at the output A1. The output A1 now acts like an input. If an enable control signal, for example a predetermined voltage level, is applied to said output A1, then the evaluation circuit 12 identifies this enable control signal. After the reception of this enable control signal, the internal controller 10 is activated, and the control signals arriving at the input E1 are evaluated. In this state, programming of the integrated circuit IC1 is possible.

Figure 2:
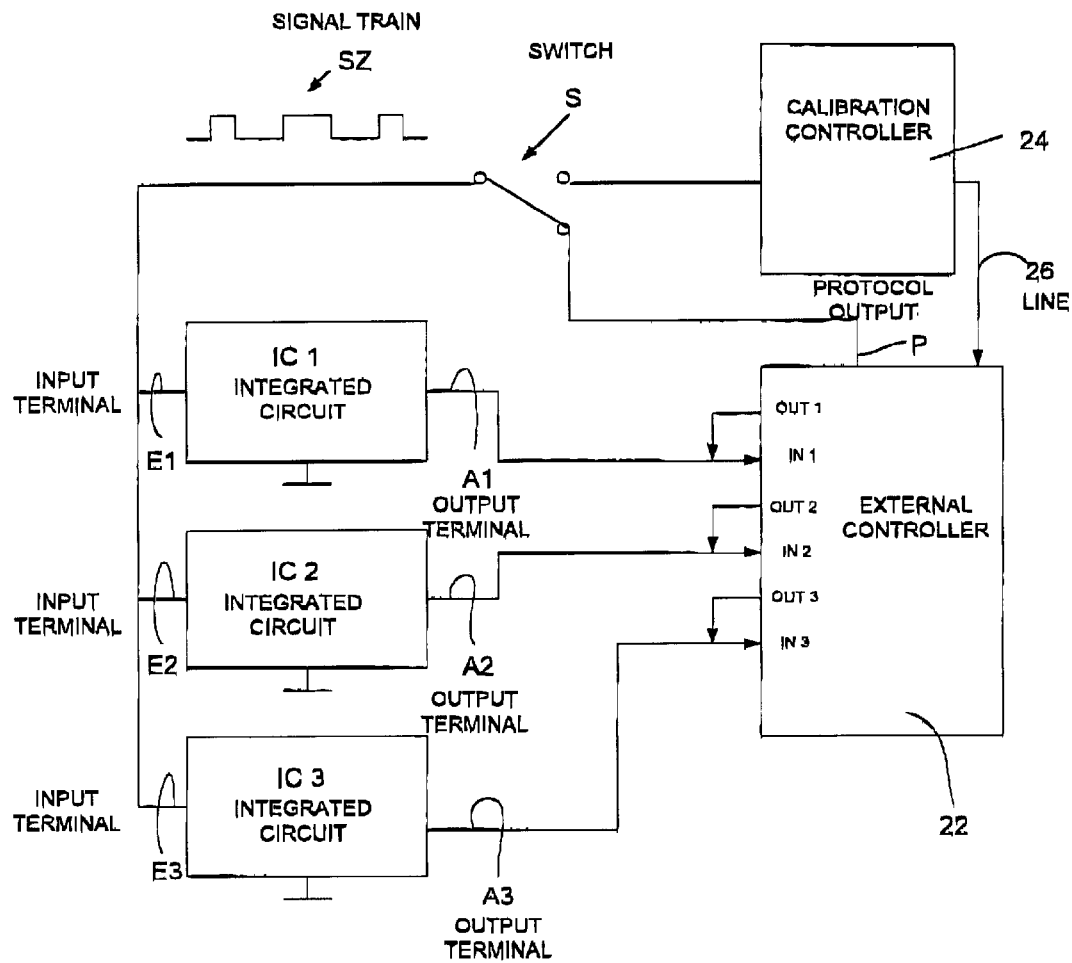
FIG. 2 shows an arrangement of a plurality of identical integrated circuits in which the setting of operating parameters is effected using the invention.

FIG. 2 shows a device for setting operating parameters in three programmable integrated circuits IC1, IC2 and IC3. The integrated circuits IC2 and IC3 have the same structure—already described—as the integrated circuit IC1 according to FIG. 1. The inputs are designated by E1, E2, E3 and the outputs by A1, A2, A3. The outputs A1, A2, A3 are connected to inputs IN1, IN2, IN3 of an external controller 22, which contains a microprocessor. Outputs OUT1, OUT2, OUT3 of the controller 22 also act on said outputs A1, A2, A3. The inputs and outputs of the controller 22 are realized by tristate modules which receive or transmit signals, depending on the switching state.

At its protocol output P, the external controller 22 transmits digital control commands in the form of voltage modulation, as is illustrated by a signal train SZ. The voltage for defining the binary states in the signal train SZ is larger than the customary supply voltage which is fed to the combined inputs E1, E2, E3. The two-frequency method is usually used for the modulation, in which a first binary state (e.g. the binary state "1") occurs as a result of an additional signal change within a defined width of a time window. If said signal change is absent, the other binary state (e.g. the binary state "0") is present.

The sequence of events for setting operating parameters in the integrated circuits IC1, IC2, IC3 is explained below. First of all, the external controller 22 outputs control commands which are fed via the jointly connected inputs E1, E2, E3 to the integrated circuits IC1, IC2, IC3. These control commands contain an inhibit command by means of which the respective internal controller of the integrated circuits IC1, IC2, IC3 sets a latching state in which the control commands contained in the signal train SZ are not evaluated further and the outputs A1, A2, A3 are each put into an inactive state in which signals present at the outputs A1, A2, A3 can be identified. The external controller then selects one of the integrated circuits, e.g. the integrated circuit IC1, and applies to the output A1 a voltage level which is identified as an enable control signal by the evaluation circuit 12. The internal controller 10 of the integrated circuit IC1 thereupon turns on the active state in which the control commands arriving at its input E1 are evaluated. The external controller 22 then transmits programming commands via its protocol output P, which commands are used to set the operating parameters in the integrated circuit IC1. The digital module 14 outputs via the output A1 a digital protocol which is read in by the external controller 22 via the input IN1. With the aid of this digital protocol, a check is made to see whether the integrated circuit IC1 has been properly programmed and is functioning entirely satisfactorily. In order to conclude the programming, an END signal is transmitted via the protocol output P, whereupon the internal controller 10 activates the output A1, which outputs an analog voltage signal corresponding to the working state of the Hall generator 18. The data stored in the EEPROM module 16 are sealed and the programming process is ended. The external controller 22 then proceeds in an analogous manner to that for the integrated circuit C1 for the further integrated circuits IC2 and IC3 as well and sets the corresponding operating parameters there. A larger number of integrated circuits can also be programmed according to the principle described.

As an alternative, it is also possible to use a calibration controller 24, which generates the corresponding control signals, a switch S being switched into the position depicted by a broken line. The calibration controller 24 transfers the address of the integrated circuit IC1, IC2 or IC3 to be programmed to the controller 22 via the line 26. The controller 22 outputs the corresponding enable control signal to the addressed integrated circuit via its outputs OUT1, OUT2, OUT3.

List of Reference Symbols

10 Internal controller
12 Evaluation circuit
14 Digital module
16 EEPROM module
18 Hall generator
20 Amplifier
22 External controller
24 Calibration controller
26 Line
IC1, IC2
IC3 Integrated circuit
E1, E2
E3 Input terminal
A1, A2
A3 Output
R Resistor
M Ground
OUT1, OUT2,
OUT3 Outputs of the external controller
IN1, IN2,
IN3 Inputs of the external controller
S Switch
SZ Signal train
P Protocol output

What is claimed is:

1. A device for setting operating parameters in a plurality of programmable integrated circuits, in which each integrated circuit has a ground terminal, at which ground potential is present, an input, via which digital control commands to be evaluated by an internal controller are fed, and an output, via which control information items concerning the state of integrated circuit are output, the inputs of a plurality of integrated circuits are connected to one another, each output is passed separately to an external control unit, after the reception of an inhibit control command, each integrated circuit latches the evaluation of received control commands and puts its output into state in which control signals can be received and evaluated, the external control unit feeds an enable control signal to a selected integrated circuit via the output thereof, whereupon the internal controller cancels the latching, and in which control commands for setting the operating parameters are subsequently output to the inputs of the integrated circuits.

2. The device as claimed in claim 1, wherein the internal controller of each integrated circuit contains an evaluation circuit, which is connected to the output and detects the incoming enable control signal.

3. The device as claimed in claim 1, wherein an END control command is output after the transmission of the control commands for setting the operating parameters.

4. The device as claimed in claim 1, wherein each programmable monolithic integrated circuit contains a Hall generator for detecting magnetic field parameters.

5. The device as claimed in claim 1, wherein each internal controller contains a digital module, which outputs protocol signals to the external controller via the output.

6. A method for setting operating parameters in a plurality of programmable integrated circuits, in which each integrated circuit has a ground terminal, at which ground potential is present, an input, via which digital control commands to be evaluated by an internal controller are fed, and an output, via which control information items concerning the state of the integrated circuit are output, the inputs of a plurality of integrated circuits are connected to one another, each output is passed separately to an external control unit, after the reception of a inhibit control command, each integrated circuit latches the evaluation of received control commands and puts its output into a state in which control signals can be received and evaluated, the external control unit feeds an enable control signal to a selected integrated circuit via the output thereof, whereupon the internal controller cancels the latching, and in which control commands for setting the operating parameters are subsequently output to the inputs of the integrated circuits.

7. A programmable integrated circuit, having a ground terminal, an input, via which digital control commands to be evaluated by an internal controller are fed, and having an output, via which control information items concerning the state of the integrated circuit are output, wherein the controller, after the reception of an inhibit control command, latches the evaluation of received control commands, wherein the output is put into a state in which control signals can be received and evaluated, wherein the internal controller cancels the latching when an enable control signal is fed in at the output, and wherein control commands arriving at the input in this state initiate the setting of the operating parameters in the integrated circuit.

8. The integrated circuit as claimed in claim 7, wherein the internal controller contains an evaluation circuit, which is connected to the output and detects the incoming enable control signal.

9. The integrated circuit as claimed in claim 7, wherein a received END control command is initiated after the transmission of the control commands for setting the operating parameters, and wherein the evaluation of received control commands is latched.

10. The integrated circuit as claimed in claim 7, wherein it contains a Hall generator for detecting magnetic field parameters.

11. The integrated circuit as claimed in claim 7, wherein the internal controller contains a digital module, which outputs protocol signals to an external controller via the output.

* * * * *